United States Patent [19]

Schulte in den Bäumen

[11] Patent Number: 4,521,068
[45] Date of Patent: Jun. 4, 1985

[54] COOLED FIELD OPTICAL SYSTEM FOR INFRARED TELESCOPES

[75] Inventor: Joachim Schulte in den Bäumen, Aalen-Röthardt, Fed. Rep. of Germany

[73] Assignee: Carl-Zeiss-Stiftung, Heidenheim on the Brenz, Fed. Rep. of Germany

[21] Appl. No.: 484,644

[22] Filed: Apr. 13, 1983

[51] Int. Cl.³ .............................................. G02B 23/02
[52] U.S. Cl. ...................................... 350/1.1; 350/505
[58] Field of Search ................ 350/1.1, 503, 504, 505, 350/573; 250/352

[56] References Cited

FOREIGN PATENT DOCUMENTS 2074754 11/1981 United Kingdom ................. 350/1.1

OTHER PUBLICATIONS

Smith, W. J., *Modern Optical Engineering*, McGraw-Hill, p. 211.

*Primary Examiner*—Bruce Y. Arnold
*Attorney, Agent, or Firm*—Stonebraker, Shepard & Stephens

[57] ABSTRACT

A cooled field optical system which serves for imaging the exit pupil of an infrared telescope with primary mirror having a central hole (Cassegrain system) onto a cooled annular diaphragm (9) which defines the field of view of the detector (14) used. It contains a field mirror (6) which is arranged behind the field diaphragm (5) of the telescope and whose focal length and distance from the field diaphragm are so selected that the image of the exit pupil is produced in the direct vicinity of the rear side of the field diaphragm (5) with a central vignetting which is greater than or equal to the aperture (15) of the field diaphragm (5). For deflection out of the coaxial ray path there is used an annular mirror (8) which is inclined to the optical axis and is arranged directly behind the field diaphragm (5). It has an elliptical hole the projected size of which is approximately the same as the size of the free passage (15) in the field diaphragm (5).

11 Claims, 2 Drawing Figures

COOLED FIELD OPTICAL SYSTEM FOR INFRARED TELESCOPES

BACKGROUND OF THE INVENTION

The present invention relates to a cooled field optical system for uncooled infrared telescopes having a primary mirror with a central hole, the field optical system producing an intermediate image of the exit pupil of the telescope at the location of a cooled diaphragm.

Such field optical systems are used, in particular, on large astronomical instruments for the spectrophotometry of celestial bodies in the infrared spectral region and serve to reduce the thermal background radiation, since, with the selection of a suitable diameter for the cooled diaphragm which defines the field of view of the detector used for the detection, the thermal radiation of the primary mirror element of the telescope will effectively be kept away from the detector at the location of the intermediate image of the exit pupil.

However, it is relatively difficult to install a field optical system with intermediate imaging of the exit pupil into a cooled Dewar flask because, in view of the rather great distance of the exit pupil of the telescope from the Dewar flask which is present in the case of large telescopes, it is necessary to operate with long focal lengths. As a rule, therefore, a folding of the optical ray path is necessary. The deflection of the beam by means of the mirror optical system, used preferably in the infrared, to be sure introduces astigmatism in the imaging of the pupil in such a manner as to result in an incorrect adaptation of the cross-section of the beam to the photosensitive surface of the detector, and this reduces the sensitivity of the latter. A remedy for this is provided by aspherically shaped deflection mirrors, which, however, are rather expensive to manufacture.

The object of the present invention is to provide a cooled field optical system of the aforementioned type which provides a compact construction and assures an imaging of the pupil which is free of astigmatism.

SUMMARY OF THE INVENTION

This object is achieved by arranging, behind the focal plane of the telescope limited by a field diaphragm, a mirror which coaxially reflects back the incident radiation and whose focal length and distance from the field diaphragm are so selected as to produce, in the vicinity of the field diaphragm, an image of the exit pupil of the telescope. The central vignetting in this pupil image is greater than or equal to the aperture of the field diaphragm.

This arrangement has an advantage in the fact that the expense for achieving the purpose in view can be kept relatively small since, as a result of the coaxial guidance of the beam, no aspherical optical system is required. As a result of the shifting of the imaging of the pupil into the vicinity of the field diaphragm, the central vignetting of the telescope, which is present in any event, can be utilized, so that no loss in sensitivity upon lateral deflection out of the coaxial ray path occurs. A simple flat annular mirror can be used for such deflection. It is arranged in the vicinity of the field diaphragm, inclined, for instance, at an angle of 45° to the optical axis of the incident ray path, and it has an elliptical hole.

It is advisable to develop the entire field optical system as a mirror optical system in order to exclude problems resulting from the high dispersion of the refracting materials used in the infrared spectral region.

It is furthermore advantageous for the cooled diaphragm at the location of the imaging of the pupil to be an annular diaphragm with central middle mask. In this way the thermal radiation of the central hole of the primary mirror of the telescope is effectively suppressed. This shadowing is even more effective than, for instance, a central free passage in the part not used for the imaging in the secondary mirror of the telescope. With this last-mentioned measure, the emission of the earth's atmosphere which passes through the free passage would still have to be considered as background. The intensity of this background, while less than that of the thermal radiation of the secondary mirror is, however, still present.

Other advantageous embodiments of the invention will be described in further detail below.

DESCRIPTION OF THE PREFERRED EMBODIMENT

Figure 1:
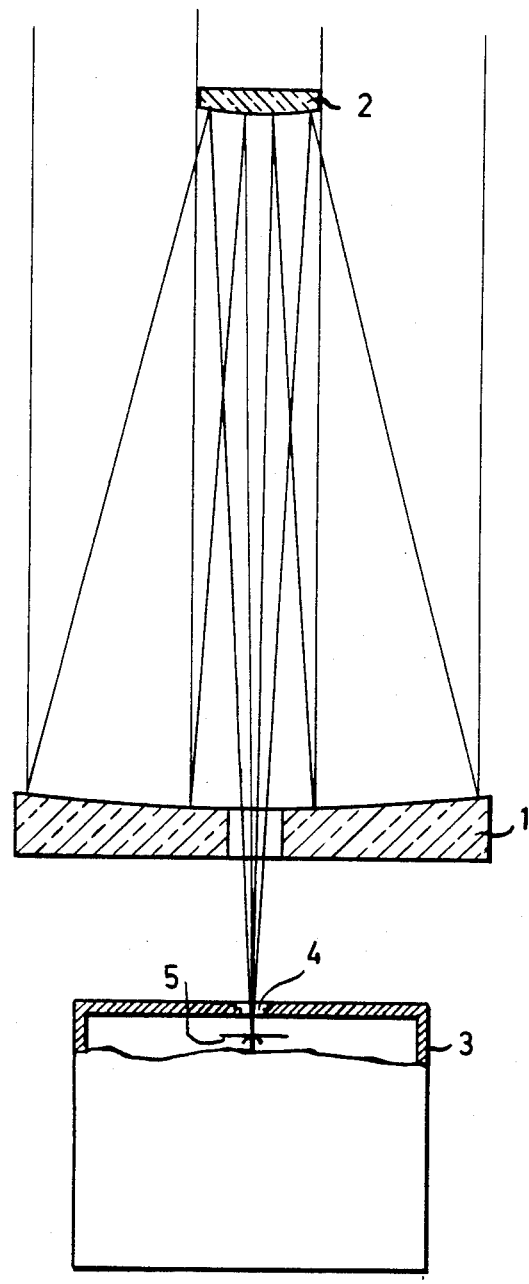
FIG. 1 diagrammatically shows the ray path in a Cassegrain telescope for IR-observations.

The telescope shown in FIG. 1 consists of a primary mirror 1 and a secondary mirror 2 which reflects the beam through the central hole in the primary mirror 1 in the direction towards the field optical system installed in a Dewar flask 3, closed by a window 4. The focal plane of the telescope, limited by the field diaphragm 5, is located in the inside of the Dewar flask 3.

The secondary mirror 2 can be developed, for instance, as a swinging mirror with, as far as possible, rectangular modulation, with which mirror two alternating observation fields are defined. One observation field contains the image of the object and the imaged background, while the other has only radiation of the background.

Figure 2:
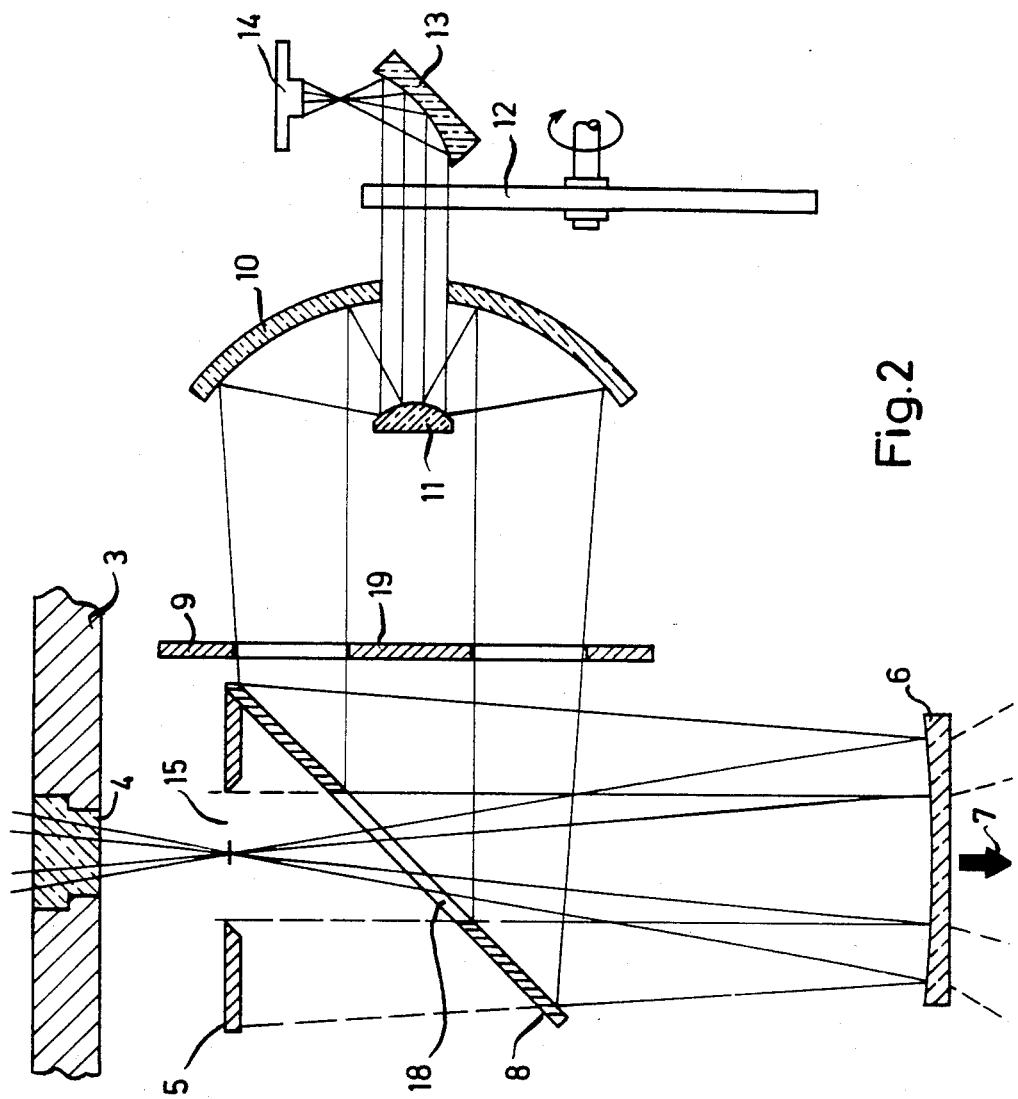
FIG. 2 shows the ray path in greater detail in the cooled field optical system 3 for the telescope of FIG. 1.

As shown in FIG. 2, a flat annular mirror 8 is arranged directly behind the field diaphragm 5. The annular mirror 8 has an elliptical opening 18 through which the radiation falls on a concave mirror 6.

The mirror 6 bears a dichroic mirroring layer. As indicated schematically by the arrow 7, an optical system (not shown) is provided behind the mirror 6 for the visible spectral region. This permits visual observation of the image of the object produced between the field diaphragm 5. This optical system contains an image intensifier.

The infrared portion of the radiation incident on the mirror 6 is reflected back on itself and, via the annular mirror 8, then perpendicular to the direction of incidence. Approximately at a distance equal to the distance between field diaphragm 5 and mirror 6 there is produced an intermediate image of the exit pupil of the telescope 1, 2. At this place there is located the annular diaphragm 9 whose outer ring portion blocks off the outer parts of the beam from the primary mirror 1 and whose central mask 19 cuts out, inter alia, the thermal radiation from the central part of the secondary mirror 2 transmitted through the central hole in the primary mirror.

Between the diaphragm 9 and the detector 14 there is a monochromator in the form of an interference filter 12. This interference filter is developed as a turntable disk with azimuthally increasing thickness of the interference layers (CVF filter) and can be replaced by different fixed filters which do not always have the same thickness of substrate.

For adaption to these filters, a coaxial mirror optical system 10, 11 is arranged in front thereof. This reduces the cross-section of the beam of the radiation to be detected and focuses the field diaphragm 5 at infinity. The mirror 11 of this Cassegrain system is located in the central shadow of the entering ray bundle and therefore does not produce any additional vignetting. As a result of the reduction in cross-section, the resolving power of the filter 12 is optimally utilized while the parallel ray path at this place prevents the position of the focus from shifting as a function of the substrate thickness of the filters used.

An elliptical concave mirror 13 concentrates the radiation on the surface of the receiver 14. The mirror 13 is less for the purpose of imaging than to effect a concentration of the light, and it is therefore non-critical with respect to the tolerances to be satisfied.

The field optical system described above can be used not only in combination with large astronomical instruments but also in combination with terrestrial infrared telescopes, for instance night-vision instruments, when obtaining of the greatest possible sensitivity is desired.

What is claimed is:

1. A cooled field optical system for uncooled infrared telescopes, comprising a telescope having a primary mirror (1) with a central hole, a secondary mirror (2), and a cooled diaphragm (9), said telescope including a field optical system producing an intermediate image of the exit pupil of the telescope at the location of said cooled diaphragm (9), characterized by the fact that behind a focal plane of the telescope limited by a field diaphragm (5) there is arranged a mirror (6) which reflects back the incident radiation coaxially, the focal length of said mirror and its distance from said field diaphragm (5) being so dimensioned as to produce in the vicinity of said field diaphragm (5) an image of the exit pupil of the telescope, central vignetting in said pupil image being greater than or equal to the aperture (15) of the field diaphragm (5).

2. The invention defined in claim 1, wherein said cooled diaphragm (9) at the location of the intermediate imaging of the pupil is an annular diaphragm which has a central mask (19).

3. The invention defined in claim 1, further comprising a flat annular mirror (8) which is inclined to the optical axis of said telescope and is arranged in the vicinity of said field diaphragm (5) between said field diaphrgm (5) and said mirror (6).

4. The invention defined in claim 3, wherein said annular mirror (8) is inclined at an angle of 45° to said optical axis and has an elliptical hole (18) for passage of a light beam therethrough.

5. The invention defined in claim 1, characterized by the fact that the entire field optical system is a mirror optical system.

6. The invention defined in claim 1, wherein said mirror (6) is a dichroic mirror.

7. The invention defined in claim 1, further comprising a mirror optical system (10, 11) which reduces the size of the cross-section of the light beam behind said cooled diaphragm (9).

8. The invention defined in claim 7, wherein said mirror optical system (10, 11) is a Cassegrain system including a secondary mirror (11) which is arranged within the central vignetting region of said telescope.

9. The invention defined in claim 7, further comprising an interference filter (12) arranged behind said mirror optical system (10, 11) in a substantially parallel optical path.

10. The invention defined in claim 9, wherein said interference filter comprises discrete filters or a rotatable filter of azimuthally extending layer thickness (CVF filter 12).

11. The invention defined in claim 9, further comprising a detector (14) having a radiation-sensitive surface, and optical means (13) following said interference filter for producing a further intermediate image of the exit pupil of said telescope on said radiation-sensitive surface of said detector (14).

* * * * *

UNITED STATES PATENT AND TRADEMARK OFFICE
CERTIFICATE OF CORRECTION

PATENT NO. : 4,521,068
DATED : June 4, 1985
INVENTOR(S) : Joachim Schulte in den Bäumen It is certified that error appears in the above-identified patent and that said Letters Patent is hereby corrected as shown below:

In the heading of the patent, add the following:

[30]  Foreign Application Priority Data

Apr. 17, 1982    [DE]  Fed. Rep. of Germany       3214269

Signed and Sealed this

Tenth Day of June 1986

[SEAL]

*Attest:*

DONALD J. QUIGG

*Attesting Officer*    *Commissioner of Patents and Trademarks*